United States Patent
Tokuyama et al.

(10) Patent No.: US 7,072,141 B2
(45) Date of Patent: *Jul. 4, 2006

(54) MAGNETIC DISC UNIT WITH RANGE OF GAP BETWEEN DISC AND SHROUD

(75) Inventors: Mikio Tokuyama, Tsukuba (JP); Hayato Shimizu, Ryugasaki (JP); Satomitsu Imai, Odawara (JP); Shozo Saegusa, Ibaraki-ken (JP); Masahiko Sega, Hiratsuka (JP); Toshihisa Okazaki, Odawara (JP); Yuzo Yamaguchi, Shimonoseki (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 55 days.

This patent is subject to a terminal disclaimer.

(21) Appl. No.: 10/680,235

(22) Filed: Oct. 8, 2003

(65) Prior Publication Data

US 2004/0070866 A1 Apr. 15, 2004

Related U.S. Application Data

(63) Continuation of application No. 09/247,550, filed on Feb. 10, 1999, now Pat. No. 6,751,050.

(30) Foreign Application Priority Data

Feb. 13, 1998 (JP) ............................. 10-030853

(51) Int. Cl.
 *G11B 33/14* (2006.01)

(52) U.S. Cl. .................................... 360/97.02

(58) Field of Classification Search .............. 360/98.01, 360/97.02, 97.03, 97.01
See application file for complete search history.

(56) References Cited

U.S. PATENT DOCUMENTS

| 4,280,155 A | 7/1981 | Scott et al. |
| 4,583,213 A | 4/1986 | Bracken et al. |
| 4,660,110 A | 4/1987 | Iida et al. |
| 5,517,372 A | 5/1996 | Shibuya et al. |
| 5,631,787 A | 5/1997 | Huang et al. |

(Continued)

FOREIGN PATENT DOCUMENTS

| EP | 0 657 889 A1 | 6/1995 |
| EP | 936614 A1 * | 8/1999 |
| EP | 1256939 A3 * | 11/2002 |
| GB | 1 409 099 | 10/1975 |
| JP | 54-154310 | 12/1979 |

(Continued)

OTHER PUBLICATIONS

"Shrouded Flexible–Disk Pack", F. E. Talke, IBM Technical Disclosure Bulletin, vol. 19, No. 5, Oct. 1976.
Multiple Accessing for Flexible Disk File Stacks, A. H. Bell et al, IBM Technical Disclosure Bulletin, vol. 22, No. 7, Dec. 1979.
Aerodynamic Aspects of Disk Files, Lennemann, Nov. 1974, pp. 480–488.

*Primary Examiner*—William J Klimowicz
(74) *Attorney, Agent, or Firm*—Antonelli, Terry, Stout & and Kraus, LLP.

(57) ABSTRACT

A magnetic disc unit having a rotating disc type magnetic disc, a head for recording and reproducing data to and from the magnetic disc, and a shroud surrounding an end surface of an outer periphery of the magnetic disc, except a part where a carriage arm is inserted, wherein a gap between the outer peripheral end surface of the magnetic disc and the shroud is set in a range which is greater than 0.1 mm but not greater than 0.6 mm.

14 Claims, 5 Drawing Sheets

U.S. PATENT DOCUMENTS

| | | |
|---|---|---|
| 5,696,649 A | 12/1997 | Boutaghou |
| 5,757,587 A | 5/1998 | Berg et al. |
| 5,801,899 A | 9/1998 | Genheimer |
| 5,898,545 A | 4/1999 | Schirle |
| 5,907,453 A | 5/1999 | Wood et al. |
| 5,956,203 A | 9/1999 | Schirle et al. |
| 6,125,003 A | 9/2000 | Tsuda et al. |
| 6,172,843 B1 * | 1/2001 | Genheimer et al. ...... 360/97.01 |
| 6,236,532 B1 * | 5/2001 | Yanagisawa ............. 360/97.02 |
| 6,271,987 B1 * | 8/2001 | Allsup et al. ............ 360/97.03 |
| 6,369,978 B1 * | 4/2002 | Shimizu et al. .......... 360/97.03 |
| 6,462,901 B1 * | 10/2002 | Tadepalli ................. 360/97.03 |
| 6,665,139 B1 * | 12/2003 | Tokuyama et al. ....... 360/97.02 |
| 6,751,050 B1 * | 6/2004 | Tokuyama et al. ....... 360/98.01 |

FOREIGN PATENT DOCUMENTS

| | | |
|---|---|---|
| JP | 59-072680 | 4/1984 |
| JP | 59-084386 | 5/1984 |
| JP | 3-150778 | 6/1991 |
| JP | 05234327 A * | 9/1993 |
| JP | 7-320478 | 12/1995 |
| JP | 08111017 A * | 4/1996 |
| JP | 9-204767 | 8/1997 |
| JP | 11-144439 | 5/1999 |

* cited by examiner

DISC-SHROUD GAP = 2 mm

DISC-SHROUD GAP = 1 mm

DISC-SHROUD GAP = 0.5 mm

DISC-SHROUD GAP = 0.2 mm

MAGNETIC DISC UNIT WITH RANGE OF GAP BETWEEN DISC AND SHROUD

CROSS REFERENCE TO RELATED APPLICATION

This is a continuation of U.S. application Ser. No. 09/247,550, filed Feb. 10, 1999, now U.S. Pat. No. 6,751,050, the subject matter of which is incorporated by reference herein and is copending with U.S. application Ser. No. 10/022,260, filed Dec. 20, 2001, now U.S. Pat. No. 6,665,139, which is a continuation-in-part of U.S. application Ser. No. 09/247,550, filed Feb. 10, 1999, now U.S. Pat. No. 6,751,050.

BACKGROUND OF THE INVENTION

The present invention relates to a rotary recording apparatus for reading and writing data from and to a rotating disc by means of a magnetic head, an optical head or the like, and in particular to a magnetic disc unit which can reduce fluid oscillation induced on a rotating disc so as to carry out positioning with a high degree of accuracy.

In a magnetic disc unit, these days, it is required to increase the capacity of memory by increasing the processing speed, and accordingly, the rotational speed of a disc has been gradually increased. However, an increase in the rotational speed, increases disc oscillation due to a fluid force caused by rotation so as to raise a new problem that the degree of positioning accuracy is lowered.

Conventionally, as disclosed in Japanese Laid-Open Patent No. S59-72680, a shroud is provided around the outer periphery of a disc with a predetermined gap between the disc and the shroud in order to reduce bounce (which well be hereinbelow referred to as "flutter")of the disc. In this document there is described that the distance between the inner wall of the shroud and the outer periphery of the disc is changed from 12 mm to 10 mm, and as a result, the amplitude of oscillation is decreased from about 20f Ê to 10f Ê. Further, if the distance is decreased to 6 mm, the amplitude of oscillation is decreased to 15f Ê, and if the distance is set to be less than 3 mm, the amplitude of oscillation becomes 8 f Ê which is relatively small. That is, if the outer periphery of the magnetic disc and the inner wall of the shroud is set to a value below 3 mm, the oscillation can be minimized.

Further, in Japanese Laid-Open Patent No. H9-204767, there is discloses a gap between a shroud and a magnetic disc which set to be 0.1 mm in order to prevent liquid lubricant with which the outer surface of the magnetic disc is coated, from scattering.

It is noted that, in the above-mentioned Japanese Laid-Open Patent No. S59-72680, there is disclosed a gap between the shroud and the disc which is 2 mm at maximum.

Further, in Japanese Laid-Open Patent No. H9-204767, there is disclosed a gap between the shroud and the disc which is 0.1 mm at maximum.

By the way, in a magnetic disc unit, a higher data transfer velocity (data rate) is desired in order to obtain a larger storage capacity. Thus, the rotational speed of a disc has been gradually increased up to now, and it is anticipated that the rotational speed will be further increased in future. An increase in rotational speed of a disc increases flutter which is oscillation of a disc, and accordingly, would mainly contribute to increase errors in positioning of a magnetic head. Thus, it has been required to reduce the oscillation.

Thus, there has mainly been two ways for reducing flutter of a disc as follows: First, a fluid force serving as an excitation source is reduced. Precisely, the pressure distribution is made to be uniform over the surface of a disc. Second, the stiffness of a disc is increased in order to decrease oscillation of a disc. Although the thickness of a disc may be increased to increase the stiffness of the disc, an increase in the thickness thereof causes a disc unit to have a larger size, and accordingly, it is unpreferable.

OBJECT AND SUMMARY OF THE INVENTION

An object of the present invention is to provide a rotary recording apparatus which can, on one hand, prevent flutter causing errors in positioning from increasing even though the rotational speed becomes higher, and which can, on the other hand, enhance the degree of positional accuracy for coping with a large storage capacity.

That is, according to the present invention, there is provided a large capacity magnetic disc unit which can reduce a fluid force serving as an excitation source so as to prevent occurrence of flutter in order to restrain occurrence of noise or the like, and which can read and write data from and onto a disc with a high degree of accuracy. Specifically, a shroud (outer wall) is provided around the entire periphery of a rotating disc, except an insertion part thereof for a carriage arm, and a gap between the shroud and the outer periphery of the disc is set to be not less than 0.1 mm but not greater than 0.6 mm.

An air stream induced during rotation of a disc causes a pressure differential between the upper and lower surfaces of the disc, which causes excitation of the disc, resulting in flutter of the disc. If the gap between the shroud and the disc is set to be narrower than a predetermined value, air on the upper and lower surfaces of the disc is isolated so as to reduce the pressure differential.

With this arrangement, it is possible to reduce the amplitude of flutter, and accordingly, the degree of accuracy for positioning a magnetic head even in a high speed recording apparatus can be enhanced.

DESCRIPTION OF THE EMBODIMENTS

Figure 1A:
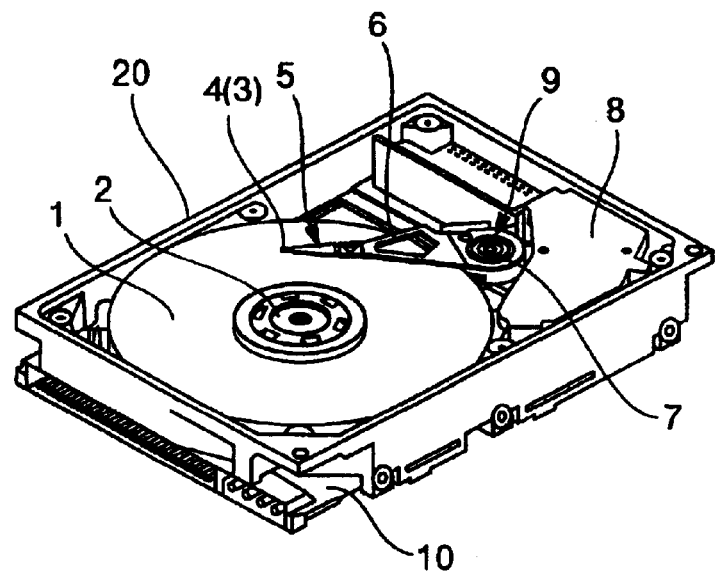
FIG. 1A is a perspective view illustrating a disc unit to which the present invention is applied.
Figure 1B:
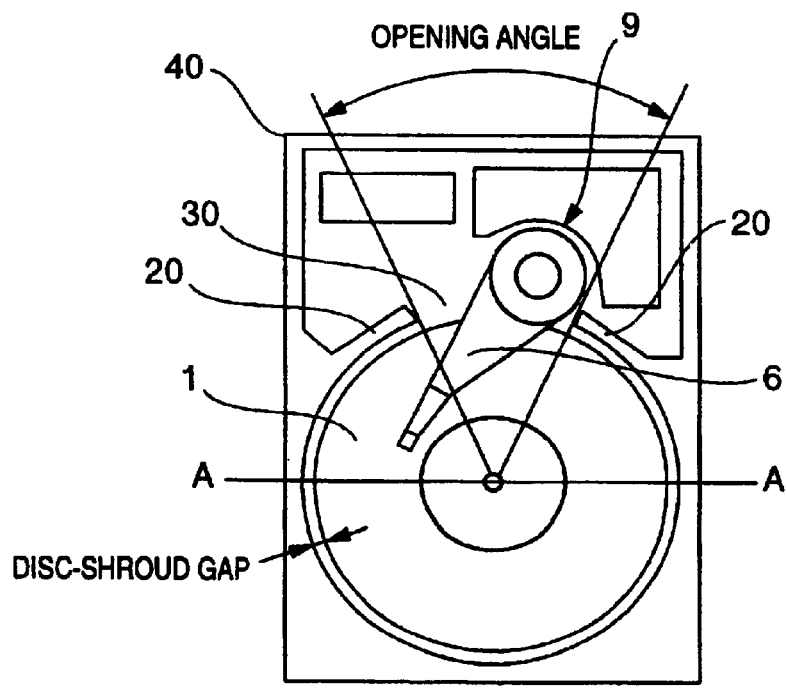
FIG. 1B is a top view illustrating the disc unit shown in FIG. 1A.

Explanation will be made of a first embodiment of the present invention with reference to FIGS. 1A to 4D. Referring to FIGS. 1A and 1B, discs 1 are stacked on a spindle 2, and a magnetic head 3 for recording and reproducing data is carried on a slider 4 which is supported by a magnetic head support mechanism 5 connected to a guide arm 6. A carriage 9 is composed of the guide arm 6, a pivot bearing 7 and a voice coil motor (which will be hereinbelow referred to as "VMC") 8, and the guide arm 6 is rotated by the VNC 8 around the pivot bearing 7. Further, these elements are set on a casting base 10 which is surrounded by a wall (shroud 20). A gap between the outer peripheries of the discs 1 and the inner wall of the shroud 20 is maintained at a predetermined distance (which will be referred to as "disc-shroud gap"). The shroud 20 and the base 10 are made of the same casting material, being integrally incorporated with each other.

The shroud 20 is formed therein with an opening 30 for introducing the guide arm 6 therethrough onto a surface of a disc 1. The opening angle of the opening 30 is selected so as to be minimized while to allow the arm to be simply assembled and to prevent the arm from making contact with the shroud even through the head is shifted from the inner periphery to the outer periphery of the disc. In this embodiment, the opening angle is set to about 45 deg.

A wall is formed along the entire periphery of the base 10 of the unit. Further, this wall serves as a part of the shroud 20 surrounding the outer peripheries of the discs 1. However, the shroud 20 is arranged to branch off from the wall in the vicinity of the opening 30 so as to surround the discs 1.

Meanwhile, the wall serves as a surrounding wall 40 for surrounding the carriage 9 so as to hermetically enclose the unit. Repeatedly, the wall surrounding the discs 1 will be hereinbelow defined and referred to as the shroud 20. According to the present invention, the gap between the shroud 20 and the end faces of the discs 1 is regulated within a predetermined range so as to reduce the amplitude of flutter which would occur during rotation of the disc at a high speed, in order to restrain occurrence of noise. Detailed explanation will be hereinbelow made of this measure.

Figure 2:
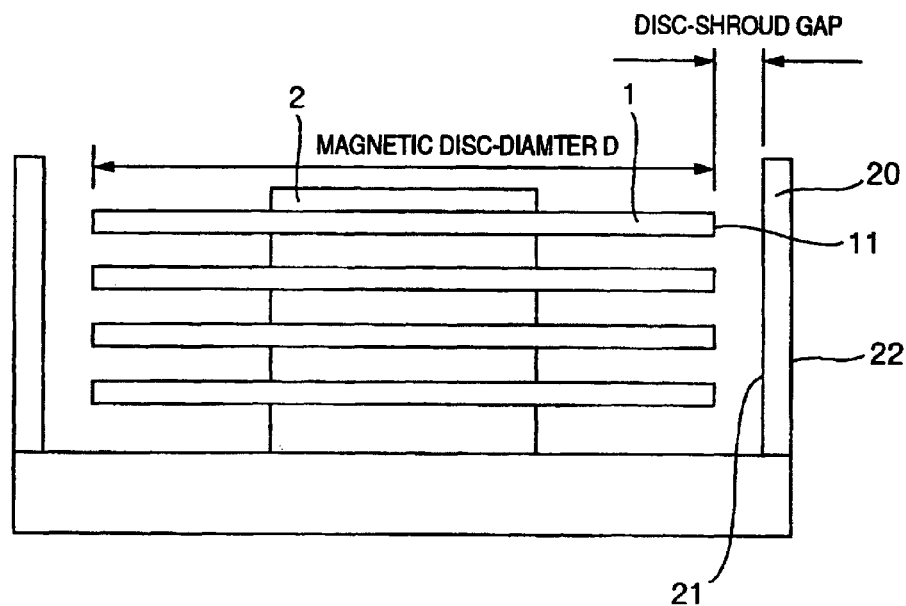
FIG. 2 is a sectional view illustrating a disc part, for defining a gap between a shroud and a disc.

Referring to FIG. 2 which is a sectional view along line A—A in FIG. 1B, the definition to the disc-shroud gap will be clarified.

As shown in FIG. 2, the spindle motor 2 is mounted on the base 10, having a shaft on which the discs 1 are stacked. The base 10 is incorporated with the shroud 20, being integrally molded therewith. The inner wall 21 of the shroud 20 is arranged along the entire periphery of the discs with a predetermined gap being held from the edge faces 11 of the discs 1 (this gap will be hereinbelow referred to as "disc-shroud gap"), except that the opening (which is not shown in FIG. 2) for introducing the arm 6 is formed in a part where the arm 6 of the carriage 9 is introduced onto a surface of a disc 1. The inner wall of the shroud is substantially circular, having a center which is substantially aligned with the rotating center of the discs 1 or the spindle motor 2. Accordingly, the above-mentioned disc-shroud gap is substantially uniform around the entire peripheries of the discs 1, except that the opening, that is, the insertion part for the arm 6, where no shroud 20 is formed.

Figure 3:
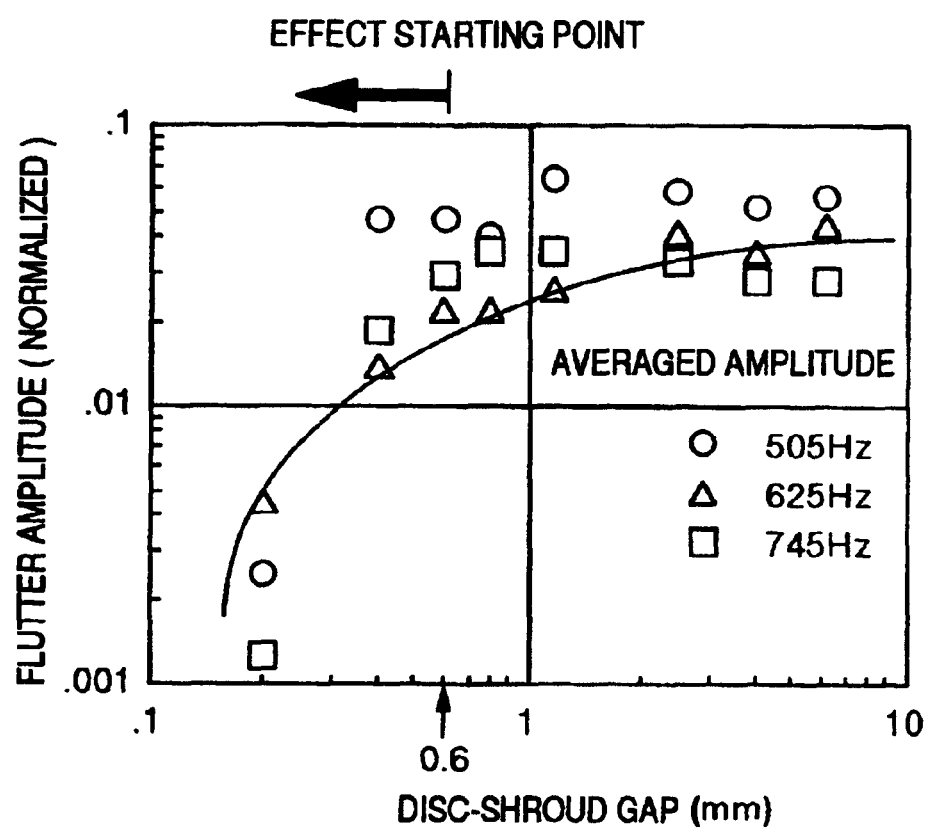
FIG. 3 is a view showing a relationship between an amplitude of flutter and a gap between the shroud and the disc.
Figure 4A:
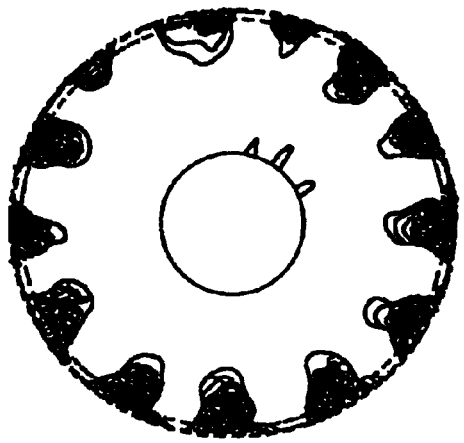
FIGS. 4A to 4B are contour maps of air pressure differential on the front and rear surfaces of a disc, which is obtained through analysis.
Figure 4B:
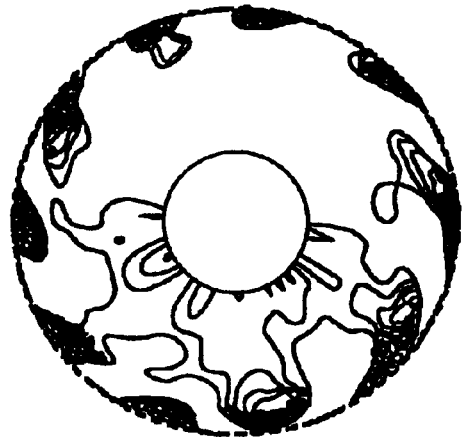
Figure 4C:
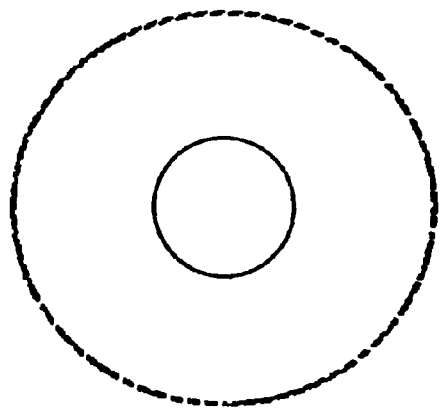
Figure 4D:
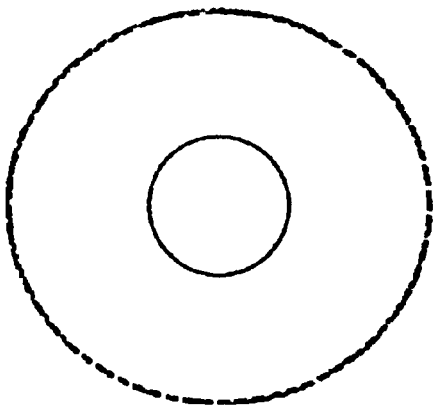

Referring to FIG. 3, there are shown results of measurements for relationship between the disc-shroud gap and the amplitude of flutter. Specifically, with the use of magnetic discs having an outer diameter of 3.5 inches, the discs were rotated at 7,200 rpm while amplitudes of flutter were measured by a displacement gage utilizing LDV (laser Doppler Velocity) while the disc-shroud gap is changed from 0.2 mm, to 0.4 mm, 0.6 mm, 0.8 mm, 1.2 mm, 2.5 mm, 4 mm and to 6 mm. The results of the measurements, which are averaged and normalized, that is, are non-dimensional values, are shown in FIG. 3.

In the figure, circular, triangular and square spots denote various flutters having different frequencies. As clearly understood from these results of measurements, the amplitude of flutter is decreased as the disc-shroud gap is decreased to a value less than 0.6 mm. Further, the amplitude of flutter is not appreciably decreased in a range from 0.6 mm to 6 mm. Meanwhile, in the case of less than 0.6 mm, if the disc-shroud gap is decreased to 0.4 mm and to 0.2 mm, the amplitude of flutter can be reduced, remarkably. Specifically, if the shroud gap is 0.2 mm, the amplitude of flutter can be decreased to a value which is about $1/10$ of the amplitude of flutter obtained with a disc-shroud gap of 0.6 mm.

In this embodiment, the disc-shroud gap is set to 0.4 mm. With this arrangement, the amplitude of flutter can be reduced to about a half of that obtained at a disc-shroud gap of about 1 mm. Of course, a disc-shroud gap of about 0.5 mm is also effective. It is desirable that the disc-shroud gap is narrower since the amplitude of flutter can become smaller. However, in view of the assembly of a disc unit, the narrower the disc-shroud gap, the more the difficulty in assembling the magnetic disc unit.

Further, it would be practically impossible to set the disc-shroud gap to a value less than 0.1 mm, in view of a diametrical tolerance (±0.05 mm) of discs which are available at present and the erection tolerance between T discs and spindles. In view of the above-mentioned facts, it has been understood that the flutter can be reduced by setting the disc-shroud gap in a range which is not less than 0.1 mm but not greater than 0.6 mm.

FIGS. 4A to 4D show contour lines of air pressure differentials between the outer and rear surfaces of a rotating disc, which were obtained from results of flow analysis in such a condition that the disc-shroud gap is narrowed. FIGS. 4A to 4D show those with a disc-shroud gap of 2 mm, 1 mm, 0.5 mm and 0.2 mm, respectively.

As understood from these figures, contour lines have crest peaks on the outer peripheral side of the disc in the case of a disc-shroud gap of 2 mm or 1 mm. These pressure differentials becomes excitation forces applied to the disc, causing the disc to flutter. Meanwhile, in the case of a small disc-shroud gap of 0.5 mm or 0.2 mm, no contour lines having crest peaks of pressure differentials causing occurrence of flutter, are found. In other words, no pressure differentials are produced, and accordingly, the amplitude of flutter becomes smaller. These results well follow the results of experiments shown in FIG. 3, qualitatively and quantitatively. Thus, it has been also understood from the results of this analysis that a disc-shroud gap of less than 0.5 mm can effectively restrain occurrence of flutter.

Reference Example

A high speed magnetic disc unit in which the outer diameter of discs is 2.5 inches, and the rotational speed is 12,600 rpm, and the opening 30 has an opening angle of 140 deg. was prepared, and tested for flutter in the following measuring conditions:

| Rotational speed: | 12,600 rpm |
| --- | --- |
| Disc thickness: | 0.8 mm |
| Measuring position: | topmost and outermost of disc |
| Measuring Method: | flutter amplitudes were measured at five low frequencied by LVD |

Figure 5:
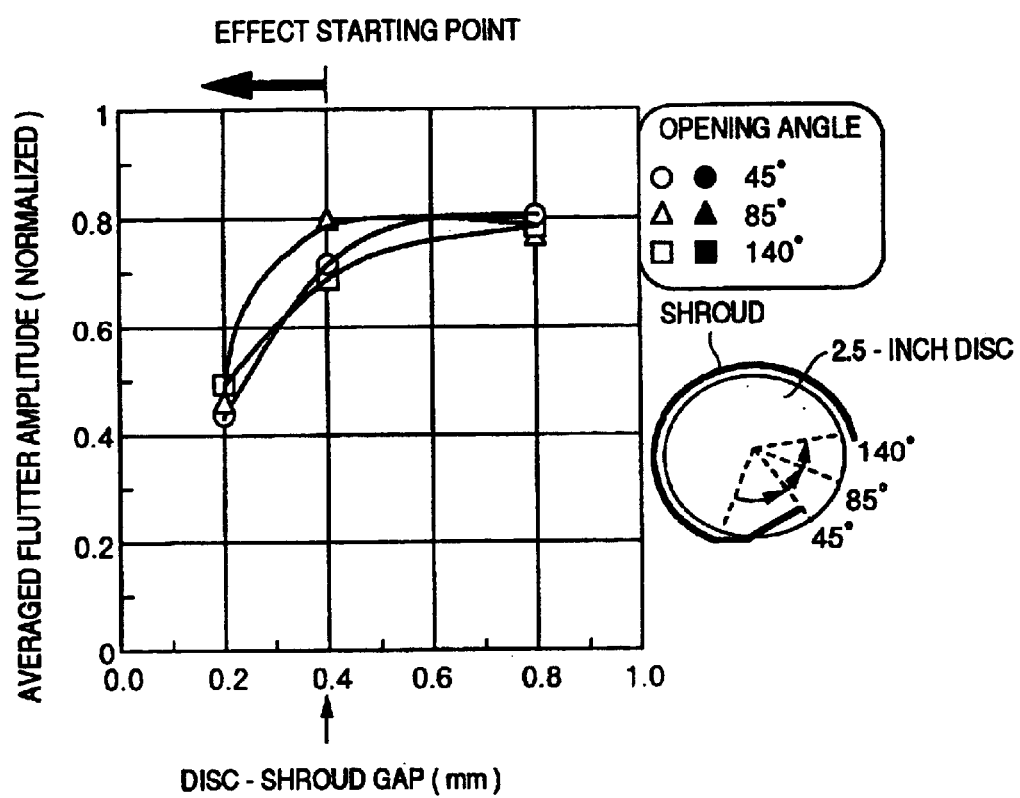
FIG. 5 is a relationship between an amplitude of flutter and a gap between a shroud and a disc.

Averaged values each obtained from the five measured amplitudes were comparatively considered (Refer to FIG. 5)

The results of these measurements show that a smaller disc-shroud gap is effective for reducing flutter, similar to the effects mentioned before. In this example, if the disc-shroud gap becomes less than 0.4 mm, the flutter reducing effects is appreciable. Thus, the disc-shroud gap is set to 0.4 mm. Accordingly, the amplitude of flutter can be reduced by about 10%. Further, if the disc-shroud gap is set to 0.2 mm, the flutter can be reduced by about 50%.

In the same example, even if the opening angle of the opening 30 is set to 45 deg., 65 deg. and to 140 deg. respectively, no distinctive difference was appreciated in the effects of reducing the amplitude of flutter by decreasing the disc-shroud gap. Namely, it has been experimentally confirmed that the flutter can be reduced by decreasing the disc-flutter gap if the opening angle was changed from 45 deg. to 140 deg. Thus, the opening angle of the opening 30 is set to about 140 deg. in view of simplicity of the assembly of the apparatus. The lower limit values of the disc-shroud gap must be set to a value greater than 0.1 mm in view of the manufacturing tolerance of outer diameter dimensions of discs and the erection tolerance of the disc unit.

Although difference between -the disc-shroud gaps of 0.6 mm and 0.4 mm for reducing flutter seems to be appreciable, if these gaps are normalized by the diameters of the discs, about 1/150 for a 2.5 inch disc and about 1/130 for a 3.5 inch disc, which are nearly equal to each other, can be obtained. In this example, the flutter can be also reduced while a high speed magnetic disc unit having a large storage capacity can be obtained. Further, with the provision of a pocket adapted to accommodate an air filter for purifying air flowing into the unit, in a part of the shroud, or the provision of a finger insertion pocket for removal of a disc the disc-shroud gap becomes large in that part in comparison with the other part of the shroud. Even in this case, it has been confirmed that effects similar to those mentioned above can be also obtained.

Although, in the first embodiment, it has been explained that the shroud 20 is made of the same casting material as that of the base 10, and is integrally incorporated with the base 10, the shroud 20 may be formed, independent from the base 10, in order to enhance the processing accuracy and the processing performance thereof, and thereafter, it may be assembled to the base 10. Alternatively, the shroud may be machined. Further, even through the disc-shroud gap is different between the uppermost and lowermost ones of the stacked discs due to a die drawing gradient of the base mold dies, it had been confirmed that the same technical effects and advantages as that of the first embodiment may be obtained if the minimum disc-shroud gap is set to a value less than 0.6 mm or 0.4 mm.

With the provision of such an arrangement according to the present invention, a cylindrical shroud is provided around magnetic discs stacked on the shaft of a spindle motor, and a gap between the shroud and the outer end faces of the discs is set in a predetermined range (not less than 0.1 but not greater than 0.6 mm), a high speed and large storage capacity magnetic disc unit can be provided.

What is claimed is:

1. A magnetic disc unit comprising a rotating disc type magnetic disc, a head for recording and reproducing data to and from said magnetic disc, and a shroud surrounding an end surface of an outer periphery of said magnetic disc, except a part where the carriage arm is inserted, wherein a gap between the outer peripheral end surface of said magnetic disc and the shroud is set in a range which is greater than 0.1 mm but not greater than 0.6 mm.

2. A magnetic disc unit as set forth in claim 1, wherein said magnetic disc is any one of a plurality of magnetic discs stacked on a shaft of a spindle motor, and said shroud is integrally incorporated with a base of said magnetic disc unit, having a machined surface opposing said peripheral end surface of the magnetic discs.

3. A magnetic disc unit as set forth in claim 1, wherein a minimum disc-shroud gap in said range is 0.2 mm.

4. A magnetic disc unit as set forth in claim 2, wherein a minimum disc-shroud gap in said range is 0.2 mm.

5. A magnetic disc unit as set forth in claim 1, wherein said shroud is a non-perforated shroud.

6. A magnetic disc unit as set forth in claim 2, wherein said shroud is a non-perforated shroud.

7. A magnetic disc unit comprising a rotating disc type magnetic disc, a head for recording and reproducing data to and from the magnetic disc, and a shroud surrounding the magnetic disc so as to define a gap between the shroud and an outer peripheral end surface of the magnetic disc which is greater than 0.1 mm but not greater than 0.6 mm, wherein air on one surface side of the magnetic disc is isolated from air on an other surface side of the magnetic disc so as to reduce a pressure differential between both of the one and the other surface sides of the magnetic disc.

8. A magnetic disc unit having a base, comprising, on the base, a magnetic disc, a spindle motor for rotating the magnetic disc, and a carriage for moving a head, for recording and reproducing data to and from the magnetic disc, between outer and inner peripheries of the magnetic disc, wherein the carriage and a wall formed around the base so as to surround the carriage are provided with respect to one peripheral portion of the magnetic disc and the spindle motor, and a shroud is provided with respect to an other peripheral portion of the magnetic disc and the spindle motor and surrounds the magnetic disc so as to define a gap between the shroud and an outer peripheral end surface of the magnetic disc which is greater than 0.1 mm but not greater than 0.6 mm.

9. A magnetic disc unit comprising:
    at least one rotating magnetic disc;
    a head for recording and reproducing data to and from the magnetic disc;
    a head support mechanism for supporting said head;
    a carriage including a guide arm linked to said magnetic head support mechanism; and
    a shroud surrounding an end surface of an outer radial periphery of said magnetic disc other than at a part where said guide arm is inserted;
    wherein a gap between said end surface of the outer periphery of said magnetic disc and said shroud is set in a range not less than 0.1 mm but not greater than 0.6 mm; and
    wherein a side wall delimits the entire periphery of the disc unit, the side wall forms at least a part of a surrounding wall of the carriag and a part of the shroud, and an inner wall of the shroud is arranged along the periphery of the disc and an outer wall of the shroud serves as a part of the side wall.

10. A magnetic disc unit as set forth in claim 9, wherein the part where the guide arm is inserted in formed therein with a shroud part which is projected inwardly so as to decrease an opening angle of the part, and which surrounds the outer periphery of the disc, and a gap between the end surface of the outer periphery of the magnetic disc and the shroud part is set in a range which is not less than 0.1 mm but not greater than 0.6 mm.

11. A magnetic disc unit as set forth in claim 9, wherein the shroud has a machined shroud surface opposing the outer peripheral end surface of the magnetic disc.

12. A magnetic disc unit as set forth in claim 11, wherein a plurality of magnetic discs are stacked on a single spindle motor shaft.

13. A magnetic disc unit as set forth in claim 9, wherein a plurality of magnetic discs are stacked on a single motor shaft, each magnetic disc having an outer diameter of 3.5 inches, and being rotated at a rated speed of not less than 7,600 rpm.

14. A magnetic disc unit as set forth in claim 9, wherein a plurality of magnetic discs are stacked on a single spindle motor, each magnetic disc having an outer diameter of 2.5 inches and being rotated at a speed of not less than 12,000 rpm, and a gap between the outer peripheral end surface of each of the magnetic discs, and the shroud is not less than 0.1 mm and not greater than 0.4 mm.

* * * * *